United States Patent
Foti et al.

(10) Patent No.: US 8,037,481 B2
(45) Date of Patent: *Oct. 11, 2011

(54) METHOD AND SYSTEM FOR ACCESSING EXTERNALLY-DEFINED OBJECTS FROM AN ARRAY-BASED MATHEMATICAL COMPUTING ENVIRONMENT

(75) Inventors: David A. Foti, Tolland, CT (US); Charles G. Nylander, Merrimack, NH (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/780,084

(22) Filed: May 14, 2010

(65) Prior Publication Data

US 2010/0223631 A1     Sep. 2, 2010

Related U.S. Application Data

(63) Continuation of application No. 11/438,778, filed on May 22, 2006, now Pat. No. 7,725,904, which is a continuation of application No. 09/518,287, filed on Mar. 3, 2000, now Pat. No. 7,051,338.

(51) Int. Cl.
*G06F 3/00* (2006.01)
(52) U.S. Cl. .................. 719/319; 719/328; 719/330
(58) Field of Classification Search ............ 719/328, 719/319, 330

See application file for complete search history.

(56) References Cited

U.S. PATENT DOCUMENTS

| | | | |
|---|---|---|---|
| 5,341,478 A * | 8/1994 | Travis et al. | 709/203 |
| 5,671,414 A | 9/1997 | Nicolet | |
| 5,696,973 A * | 12/1997 | Agrawal et al. | 717/154 |
| 6,061,721 A | 5/2000 | Ismael et al. | |
| 6,122,578 A | 9/2000 | Knolle | |
| 6,138,170 A | 10/2000 | Matheson | |
| 6,192,418 B1 | 2/2001 | Hale et al. | |
| 6,230,160 B1 | 5/2001 | Chan et al. | |
| 6,282,699 B1 | 8/2001 | Zhang et al. | |
| 6,289,395 B1 | 9/2001 | Apte et al. | |
| 6,415,434 B1 | 7/2002 | Kind | |
| 6,442,752 B1 * | 8/2002 | Jennings et al. | 717/162 |

FOREIGN PATENT DOCUMENTS

EP     0690375 A2     1/1996

OTHER PUBLICATIONS

Roberto Zicari, A Framework for Schema Updates in an Object-Oriented Database System, 1991.*

(Continued)

*Primary Examiner* — Lechi Truong
(74) *Attorney, Agent, or Firm* — Nelson Mullins Riley & Scarborough LLP

(57) ABSTRACT

A method and apparatus, including a computer program apparatus, which facilitate invoking methods of objects defined within an object-oriented environment from an array-based technical computing environment often used in conventional mathematical tools. When a method is invoked from the computing environment, the techniques automatically compare the array input parameters with data-types accepted by methods defined within the object-oriented environment. Based on this comparison, the invention selects a method that best accepts the input arrays. The invention, therefore, allows a user to easily invoke methods from external objects, such as Java objects, directly from the technical computing environment of the mathematical tool.

17 Claims, 5 Drawing Sheets

OTHER PUBLICATIONS

Castagna, Giuseppe et al., "A Calculus for Overloaded Functions with Subtyping," retrieved online at citeseer.ist.psu.edu/cache/papers/cs/635/ftp:zSzzSzftp.ens.frzSzpubzSzdmizSzuserszSzcastagnazSzinfocompu.pdf/castagna95calculus.pdf (1995).

Cormack, G.V. et al., "An Algorithm for the Selection of Overloaded Functions in ADA," ACM SIGPLAN Notices, vol. 16(2):48-52 (1981).

Eaton, John W., "GNU Octave, A high-level interactive language for numerical computations, Edition 3 for Octave version 2.1.x," obtained online at cpsc.ucalgary.ca/Help/unixsoftware/comput/math/octave2.1/octave/interpreter/ (1997).

Flanagan, David, "JAVA in a Nutshell, a Desktop Quick Reference" 3rd Edition, Paula Ferguson, Editor, Published by O'Reilly & Associates (1999).

Gay, David M., "Symbolic-Algebraic Computations in a Modeling Language for Mathematical Programming," Symbolic-algebraic Methods and Verification Methods—Theory and Applications, Schloss Dagstuhl, Germany (1999).

Gehani, Samir B., "A Java-based Framework for Explicitly Partitioning Applications into Distributable Units," Thesis submitted in partial satisfaction of the requirements for the degree of Master of Science in the Department of Computer Science of the University of San Francisco, (1997).

IBM Technical Disclosure Bulletin, "Generating Event Adapters to Facilitate Connections Between Java Beans," vol. 41(1):125-128 (1998).

Jython, "Accessing Java from Jython," retrieved online at jython.org/docs/usejava.html (2007).

Keene, Sonja E., "Object-Oriented Programming in Common Lisp, A Programmer's Guide to CLOS," Published by Addison-Wesley (1989).

Leung, Chee Woo David et al., "An Integration of Spreadsheet, Inheritance and Production System for Knowledge Based Manpower Planning," Computational Intelligence, III, Proceedings of the International Symposium Computational Intelligence, p. 123-134 (1990).

Liang, Sheng, "The Javaa Native interface, Programmer's Guide and Specification," Published by Addison-Wesley (1999).

Moore, John Henry, "Microsoft's New, Improved Proxy Server," obtained online atht:.windowsitpro.com/article/proxy-server2/microsoft-s-new-improved-proxy-server.aspx (1997).

NEC Corp., "Index implementation method for object oriented database—involves comparing value of structure type member variable to obtain size related rank for variables," (1997).

Pohlheim, Hartmut, "GEATbx: Genetic and Evolutionary Algorithm Toolbox for use with MATLAB, Version 1.92," obtained online at: geatbx.com/docu/index.html (1997).

Tarjan, Robert, "Depth-first Search and Linear Graph Algorithms," SIAM J. Comput., vol. 1(2):146-160 (1972).

Tarjan, Robert, "Enumeration of the Elementary Circuits of a Directed Graph," Cornell University Technical Report No. TR 72-145 (1972).

Tiernan, James C., "An Efficient Search Algorithm to Find the elementary Circuits of a Graph," Communications of the ACM, vol. 13(12):722-726 (1970).

Tierney, Luke, "Connecting Lisp-Stat to COM," Journal of Computational and Graphical Statistics, vol. 9(3):459-469 (2000).

Venners, Bill, "Eternal Math, A Simulation of the Java Virtual Machine," obtained online at: artima.com/insidejvm/applets/EternalMath.html (1999).

Weinblatt, Herbert, "A New Search Algorithm for Finding the Simple Cycles of a Finite Directed Graph," Journal of the Association for Computing Machinery, vol. 19(1):43-56 (1972).

Invalidity Contentions of Defendants Comsol AB and Comsol, Inc., Regarding '338 Patent Pursuant to Local Patent Rule 3-3, Case No. 6:06-CV334 LED, Plaintiff: The Matworks, Inc., Defendants: Comsol AB and Comsol, Inc.

Amended Invalidity Contentions of Defendants Comsol AB and Comsol, Inc., Regarding '338 Patent Pursuant to Local Patent Rule 3-3, Case No. Case No. 6:06-CV334 LED, Plaintiff: The Matworks, Inc., Defendants: Comsol AB and Comsol, Inc.

* cited by examiner

| Mathematical Tool Data Type | Java Data Type | | | | | | |
|---|---|---|---|---|---|---|---|
| | Best Fit | | | | | | Worst Fit |
| logical | boolean | | | | | | |
| double | double | float | long | int | short | byte | boolean |
| single | float | double | | | | | |
| char | String | char | | | | | |
| array of char arrays | String | | | | | | |
| array of arrays | Object | | | | | | |
| unsigned 8-bit int | byte | short | int | long | float | double | |
| unsigned 16-bit int | short | int | long | float | double | | |
| unsigned 32-bit int | int | long | float | double | | | |
| signed 8-bit int | byte | short | int | long | float | double | |
| signed 16-bit int | short | int | long | float | double | | |
| signed 32-bit int | int | long | float | double | | | |
| java | Object | | | | | | |

| Java Data Type | Mathematical Tool Data Type (for scalar Java types) | Mathematical Tool Data Type (for array Java types) |
| --- | --- | --- |
| boolean | double precision floating point | boolean |
| byte | double precision floating point | 8-bit signed integer |
| char | char | char (16-bit) |
| short | double precision floating point | 16-bit signed integer |
| int | double precision floating point | 32-bit signed integer |
| long | double precision floating point | double precision floating point |
| float | double precision floating point | double precision floating point |
| double | double precision floating point | double precision floating point |
| java.lang.String Object | char array | char array |
| Java object | Reference to Java object | Reference to Java object |

*Fig. 4*

METHOD AND SYSTEM FOR ACCESSING EXTERNALLY-DEFINED OBJECTS FROM AN ARRAY-BASED MATHEMATICAL COMPUTING ENVIRONMENT

RELATED APPLICATIONS

This application is a continuation of, and claims benefit to, U.S. patent application Ser. No. 11/438,778, filed May 22, 2006, now U.S. Pat. No. 7,725,904 which is a continuation of, and claims benefit to, U.S. patent application Ser. No. 09/518,287, filed Mar. 3, 2000, now U.S. Pat. No. 7,051,338, issued May 23, 2006. The entire contents of the aforementioned applications are hereby incorporated by reference.

TECHNICAL FIELD

The invention relates generally to mathematical computer programs.

BACKGROUND

A conventional mathematical tool, such as such as MATLAB™ from MathWorks™, Inc., of Natick, Mass., provides a comprehensive technical computing environment for performing numerical linear algebraic calculations, solving ordinary differential equations, analyzing data, and visualizing solutions to complex mathematical formulas by generating graphs or other images. The computing environment often provides a high-level programming language that includes a variety of operators and programming commands.

Engineers use such mathematical tools for a variety of applications such as designing complex mechanical and electrical control systems, solving optimization problems and performing statistical analysis. In addition, engineers often use mathematical tools in conjunction with a simulation tool for defining and simulating complex mathematical models. For example, manufacturers of mechanical and electronic systems, e.g., cars and integrated circuits, use simulation tools to help them design their products. These tools allow designers to build and test mathematical models of their systems before building a physical prototype. Commercial simulation models can be extremely complex and may include thousands of interconnected functional blocks. Using a simulation tool, a designer can simulate and observe changes in a model over a period of time, typically represented as a series of discrete instants, called time steps, such as 1 millisecond, 1 second, 2 hours, etc. Starting from a set of initial conditions, specified by the designer, the simulation tool drives the model and determines the state of the model at various time steps.

Most technical computing environments provided by conventional mathematical tools are "array-based" such that data types are primarily represented as two-dimensional arrays. In other words, these computing environments do not distinguish between a scalar, a vector, or a matrix. As a result, it is difficult to interface the technical computing environment to an object-oriented environment, such as Java. Because the technical computing environment does not distinguish between scalars, vectors and matrices, it is difficult to invoke methods that have the same name and are only distinguishable by the data types of their input parameters. In addition, it is difficult to translate data from the array-based computing environment of the mathematical tool to the object-oriented environment.

SUMMARY OF THE INVENTION

In general, the invention provides a method and apparatus, including a computer program apparatus, which facilitate invoking methods of objects defined within an object-oriented environment from a technical computing environment provided by a mathematical tool. In particular, the invention is directed to techniques for invoking methods of objects defined in an object-oriented environment, such as a Java environment, from an array-based computing environment often used in conventional mathematical tools. When a method is invoked from the computing environment, the techniques automatically compare the input parameters, which are typically arrays, with data types accepted by methods defined within the object-oriented environment. Based on this comparison, the invention automatically selects a method that best accepts the input arrays. The invention, therefore, allows a user to easily invoke methods from external objects, such as Java objects, directly from the technical computing environment of the mathematical tool.

In one aspect, the invention is directed to a technique for invoking a method defined within an object-oriented environment. According to the technique, a list of method signatures corresponding to a particular class and method name is retrieved from the object-oriented environment. Each signature uniquely identifies a corresponding method and lists the method's name and any data types received by the method. After the list is retrieved, the method signatures are ranked by comparing the data types of the signatures with the data types of the input parameters received from the technical computing environment of the mathematical tool. Based on the ranking, one of the method signatures is selected and the corresponding method within the object-oriented environment is invoked unless no suitable method is found, in which case an error condition is raised.

In another aspect, the invention is directed to a computer program, such as a mathematical tool, having instructions suitable for causing a programmable processor to retrieve a list of method signatures from the object-oriented environment. The computer program ranks the method signatures, selects one of the method signatures according to the ranking; and invokes the corresponding method within the object-oriented environment corresponding to the method signature.

In yet another aspect, the invention is directed to a computer system having an object-oriented environment and a mathematical tool executing thereon. The object-oriented environment includes an interface for identifying methods provided by objects defined within the object-oriented environment. The mathematical tool includes a calculation workspace, a command interpreter, and a signature selector. When the command interpreter encounters a reference to a method implemented by an object defined within the object-oriented environment, the command interpreter instructs the signature selector to access the interface of the object-oriented environment to retrieve and rank a list of signatures corresponding to methods defined within the object-oriented environment. The command interpreter invokes one of the methods as a function of the ranking.

The details of various embodiments of the invention are set forth in the accompanying drawings and the description below. Other features and advantages of the invention will become apparent from the description, the drawings, and the claims.

BRIEF DESCRIPTION OF THE DRAWINGS

FIG. 3 illustrates one embodiment of a two-dimensional table that stores data types supported by an object-oriented environment ordered by preference.

FIG. 4 illustrates one embodiment of a conversion table suitable for converting data types from an object-oriented environment to an array-based computing environment of a mathematical tool.

DETAILED DESCRIPTION

Figure 1:
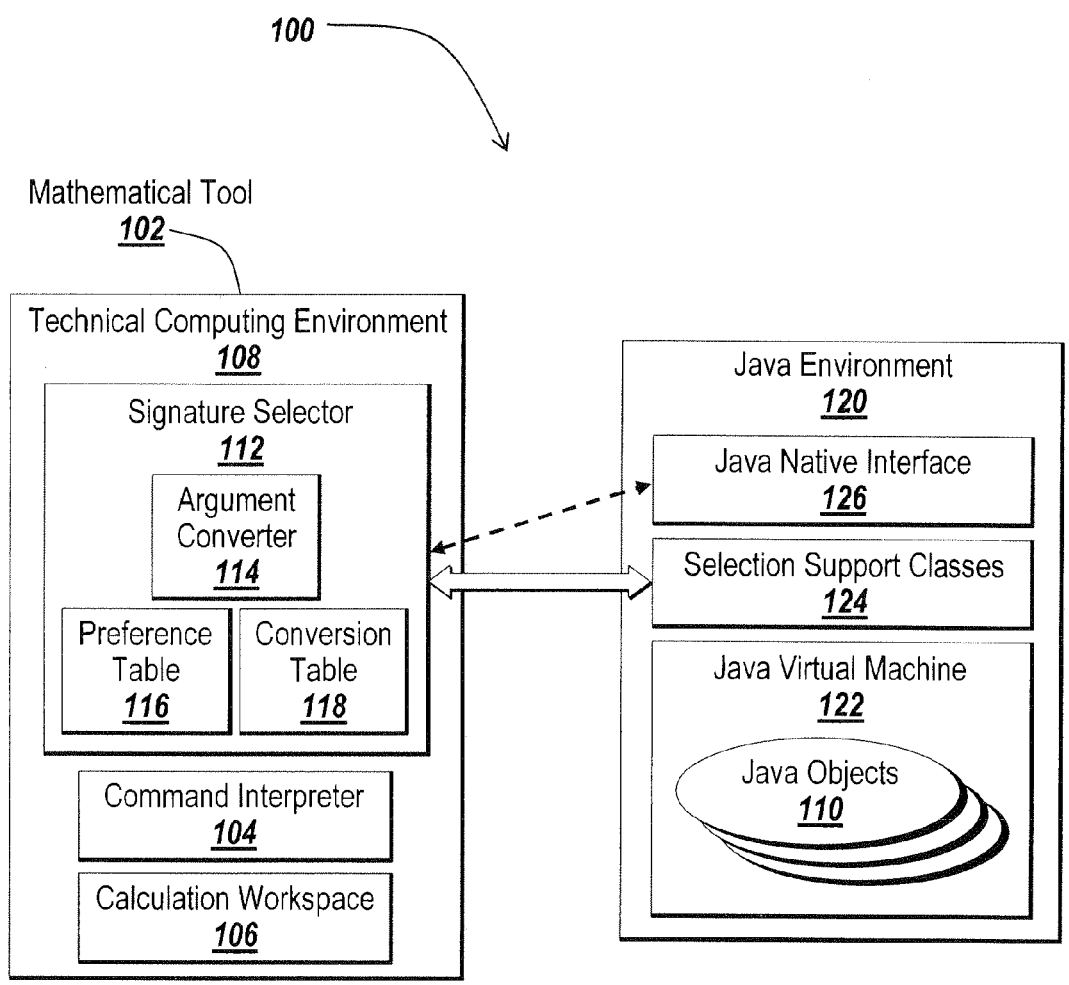
FIG. 1 is a block diagram illustrating a system in which a mathematical tool invokes a method of an object defined within an object-oriented computing environment.

FIG. 1 is a block diagram illustrating a system 100 in which mathematical tool 102 invokes an object 110 in an object-oriented environment such as Java environment 120. Mathematical tool 102 provides a technical computing environment 108 for performing a wide variety of numerical calculations and data analysis operations. Computing environment 108 of mathematical tool 102 is "array-based" such that most data types are represented as arrays of at least two dimensions.

Computing environment 108 of mathematical tool 102 is an interpreted environment that supports a high-level programming language having a variety of operators and to programming commands. As the user enters instructions, command interpreter 104 interactively interprets and executes each instruction. Calculation workspace 106 provides a storage area for variables, input data, and resultant data. The user can, for example, define a square matrix within calculation workspace 106 using a single command. The user can directly manipulate the matrix, using one command to find its inverse, another command to find its transpose, or another command to learn its determinant.

In an object-oriented environment, such as Java environment 120, objects 110 are modules of computer code that specify the data types of a data structure, and also the kinds of operations (or "methods") that can be applied to the data structure. Each object 110 has a corresponding "class" that may be thought of as a prototype that defines the data structures and methods common to all objects of a certain kind. Objects 110 are created at run-time in accordance with their class definition. Thus, each object 110 is a unique instance, referred to as an instantiation, of its corresponding class.

Within a class, each method having the same name must have a different number of inputs, or one or more inputs must differ in data type. Each method has a "signature", which is a unique representation of the method's name and the number and type of each input and output parameter of the method. The method signature is used to distinguish between methods having the same name. For example, in a Java signature, the data types boolean, byte, char, short, int, long, float, and double, are represented in the signature by a single letter: Z, B, C, S, I, J, F, and D, respectively. For all other data types, the signature is an expression of the form "Lclass-name;" where class-name is the name of the corresponding Java class but with dots replaced by the slash character. A void return data type is indicated as a V. Thus, the signature for the method:

void sampleMethod(int arg1, double arg2, java-
        .lang.String arg3)

has a corresponding signature:

(IDLjava/lang/String;)V

At the core of Java environment 120 is virtual machine 122, which provides a self-contained operating environment that is machine independent. Java objects 110 execute within virtual machine 122 regardless of the underlying operating system or hardware and represent any class that virtual machine 122 can see within its scope of execution.

The invention allows a user to easily invoke methods of objects 110 from mathematical tool 102. This allows the user to exploit the rich functionality offered by Java environment 120. For example, the user can invoke Java objects 110 in order to quickly design a graphical user interface (GUI). In addition, the user can use Java objects 110, such as timers and events, within calculation workspace 106. For example, the user can define and access Java objects 110 from within calculation workspace 106 as follows:

jstr=java.lang.String('Hello World');

imFilter.setPixels(5,5,100,100,cm,X,0,100);

In order for mathematical tool 102 to provide a way for users to invoke objects 110 and their corresponding methods, command interpreter 104 invokes signature selector 112 that automatically determines the appropriate signature of the requested method for invocation. When the user invokes a method provided by one of the objects 110, command interpreter 105 passes signature selector 112 a name of the method and any input parameters to pass to the method. Because the input parameters are defined in native data types supported by technical computing environment 108, the parameters are often in the form of an array having any number of dimensions. As described in detail below, signature selector 112 automatically selects a method from object-oriented environment 120 that is best able receive the data from the array inputs.

More specifically, signature selector 112 uses a set of classes within Java environment 120, referred to herein as selection support classes 124, to interrogate Java environment 120. Signature selector 112 passes selection support classes 124 a method name and the name of its corresponding class. Based on the class name and method name, selection support classes 124 determine a set of matching method signatures available within object-oriented environment 120. In order to communicate with selection support classes 124, signature selector 112 uses Java native interface (JNI) 126, which is a programming interface, or API, that allows programs written in C or C++ to invoke Java methods based on a method signature. Signature selector 112 determines and returns the signature of the method available within object-oriented environment 120 that is best able to receive the data from the array inputs. If no suitable methods are found, signature selector 112 returns a null signature. Command interpreter 104 uses selected signature 112 to directly invoke the corresponding object 110 and execute the desired method.

Figure 2:
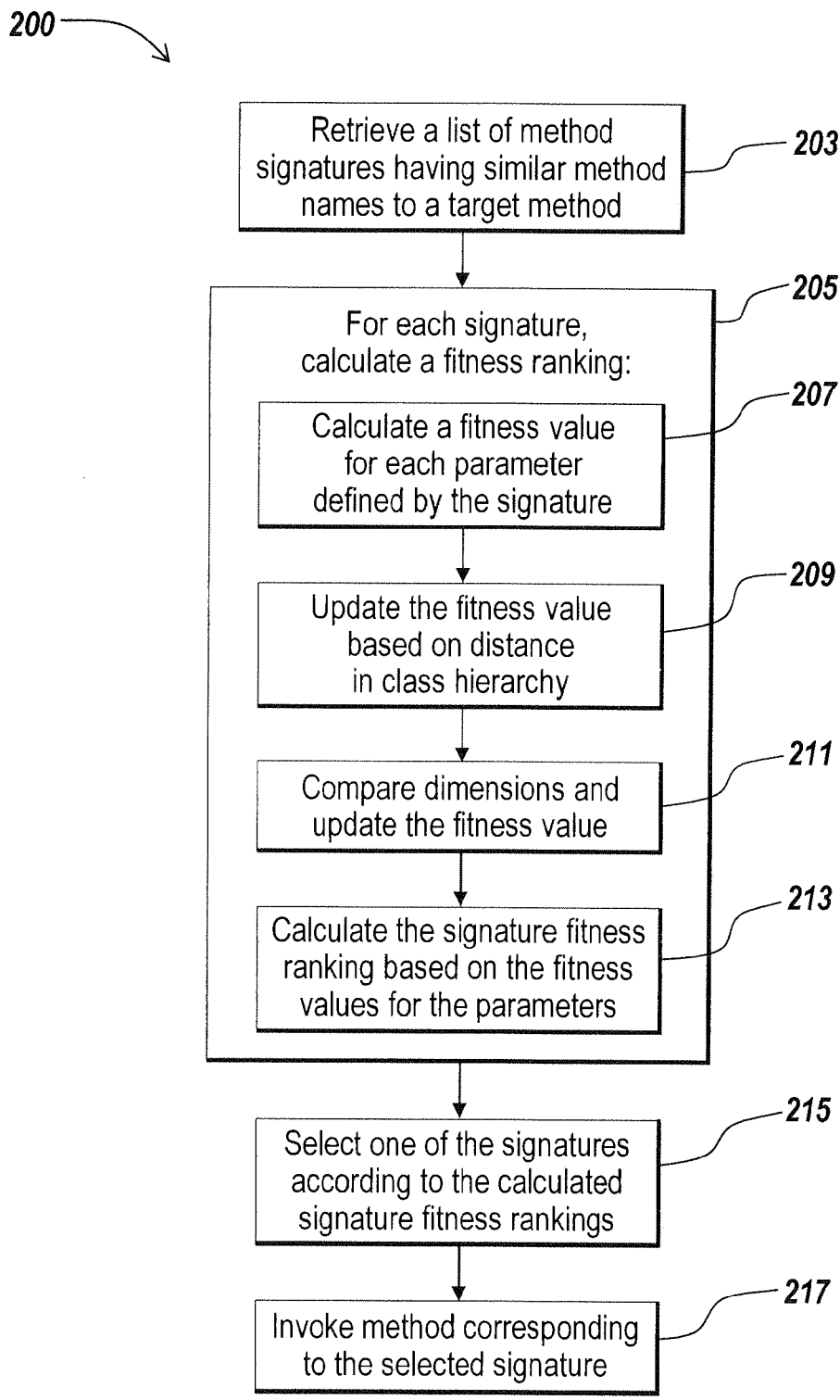
FIG. 2 is a flow chart illustrating one embodiment of a process, suitable for implementation in a computer program, in which the mathematical tool invokes the method of the object.

FIG. 2 is a flow chart illustrating one embodiment of a process 200, suitable for implementation in a computer program application, in which mathematical tool 102 (FIG. 1) invokes a method of a Java object 110 defined within Java environment 120. When the user seeks to invoke a method provided by one of the Java objects 110, command interpreter 104 invokes signature selector 112 to automatically determine the appropriate signature of the requested method. Selection support classes 124 interrogate java environment 120 and compiles a list of method signatures having names similar to the requested method and having a matching class name (step 203).

Next, signature selector 112 calculates a "fitness ranking" for each method signature of the list (step 205). The fitness ranking indicates how well the input data types of each method match the input parameters passed from calculation workspace 106, i.e., how well the method is able to receive the data from the input arrays. In order to calculate a signature's fitness ranking, signature selector 112 generates a "preference value" for each data type specified by the signature by comparing each data type with the input parameters received from workspace 106 (step 207). For each data type specified by the signature, signature selector 112 references preference table 116, which maps data types of computing environment 108 to acceptable data types of Java environment 120 ordered by preference.

FIG. 3 illustrates one embodiment of a two-dimensional preference table 116. Each row of selection preference table 116 corresponds to a unique array type supported by computing environment 108. For example, row 310 corresponds to input parameters of type array of doubles and lists preferred data types for Java environment 120 as double, float, long, integer, byte and boolean ordered from best fit to worst fit. Thus, for input parameters of type array of doubles, signature selector 112 generates a preference value by determining the location of the corresponding signature data type within row 310. If the corresponding data type defined by the signature is not found within row 310 then signature selector 112 rejects the signature from the list.

In calculating the preference value for an input data type defined by the signature, signature selector 112 also considers whether the data type of the signature and the corresponding input parameter received from calculation workspace 106 are both classes. If so, signature selector 112 updates the preference value for that signature data type as a function of how many levels separate the two classes within a class hierarchy (step 209).

Next, signature selector 112 compares the number of dimensions of the input array received from calculation workspace 106 against the number of dimensions of the Java input data type defined by the current signature (step 211). If the number of dimensions of the input array is larger than the number of dimensions of the Java data type, the signature is rejected because the input array cannot fit into any Java parameter that can be passed to the Java method. If the number of dimensions of the Java data type is larger than that of the input array, the input array is promoted by adding dimensions of length 1. However, because the match is not perfect, the corresponding preference value is adjusted in proportion to the degree of difference between the number of dimensions of the signature data type and the number of dimensions of the input array. In one implementation, signature selector 112 does not count dimensions of length 1 when determining the number of dimensions. For example, a 5.×1 array is considered to have a single dimension.

After calculating a preference value for each data type specified by the signature, signature selector 112 calculates the fitness ranking for the signature according to the individual preference values for the data types defined by the signature (step 213). It should be noted, however, that signature selector 112 need not explicitly store the calculated preference value for each parameter of the signature. To the contrary, signature selector 112 can calculate the fitness ranking for the signature while iterating over the data types defined by the signature. In one implementation, signature selector 112 initializes a fitness ranking, Fitness_Ranking, to a large number, such as 20, and updates the ranking for each parameter of the current method signature. For example, consider the following method invoked from within workspace 106:

```
f=javaObject.example_method(parameter1, parameter2);
```

Assume parameter1 of the method is a 1×1 array of doubles and parameter2 is a 15×1 array of characters. Consider a method signature defining a first data type long and a second data type array of char having two dimensions. Signature selector 112 subtracts two from Fitness_Ranking because, in selection preference table 116, the data type long is third of the data types preferred for an input data type array of doubles. Next, signature selector 112 determines that the data type array of char is in the most preferred data type for an input data type of array of characters and, therefore, does not adjust Fitness_Ranking, Because the parameters are not objects, signature selector 112 does not adjust Fitness_Ranking based on differences in class level. Next, signature selector 112 considers the dimensions and determines that the first data type of the signature, long, is a perfect match dimensionally for a 1×1 array of doubles. Thus, signature selector 112 does not update Fitness_Ranking. However, the two dimensional array of char is one dimension greater than the 15×1 array of characters, so signature selector 112 adjusts Fitness_Ranking by one, resulting in a final value for Fitness_Ranking of 17.

After calculating fitness rankings for each potential signature, signature selector 112 selects the signature having the highest ranking, unless all of the signatures have been rejected as being unsuitable (step 215). Signature selector 112 returns the selected signature to command interpreter 104.

Upon receiving a valid signature, command interpreter 104 invokes the corresponding Java method within object-oriented environment 120 (step 217). Invoking the Java method has two parts: (1) converting input array parameters from computing environment 108 to input parameters defined by the signature, and (2) converting parameters returned by the method into suitable data types defined within computing environment 108.

In converting an input array to a data type defined by the signature, argument converter 114 of signature selector 112 generates a Java variable according to the signature and copies data from the input array to newly created variable. Signature selector 112 returns the newly created variable to command interpreter 104 for use when invoking the corresponding method.

If the invoked method has a return value, signature selector 112 examines the signature and determines the dimensions of the return value. Argument converter 114 of signature selector 112 then references conversion table 118 and creates a return variable within workspace 106 for holding the return data. FIG. 4 illustrates one embodiment of a conversion table 118 suitable for converting data types from an object-oriented environment, such as Java environment 120, to array-based computing environment 108 of mathematical tool 102. If the return parameter is scalar, then the return variable primarily defaults to a 1×1 array of type double precision floating point. If the Java return value is a rectangular multi-dimensional array, signature selector 112 creates an array having the same number of dimensions as the return value and having the same data type. If, however, the return value is an array of arrays in which the inner arrays have different lengths, then signature selector 112 creates an array of arrays because it cannot create a single, rectangular array. Similarly, signature selector 112 applies this technique for return values of having greater dimensions. After creating the return variable in workspace 106, signature selector 112 copies data from the return parameters directly into the return variable and passes the return variable to command interpreter 104.

Various embodiments have been described of a method and system that facilitates invoking methods of objects defined within an object-oriented environment from an array-based technical computing environment often used in conventional mathematical tools. The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable within an operating environment of a programmable system including at least one programmable processor (computer) coupled to receive data and instructions from, and to transmit data and instructions to, a data storage system, at least one input device, and at least one output device.

Figure 5:
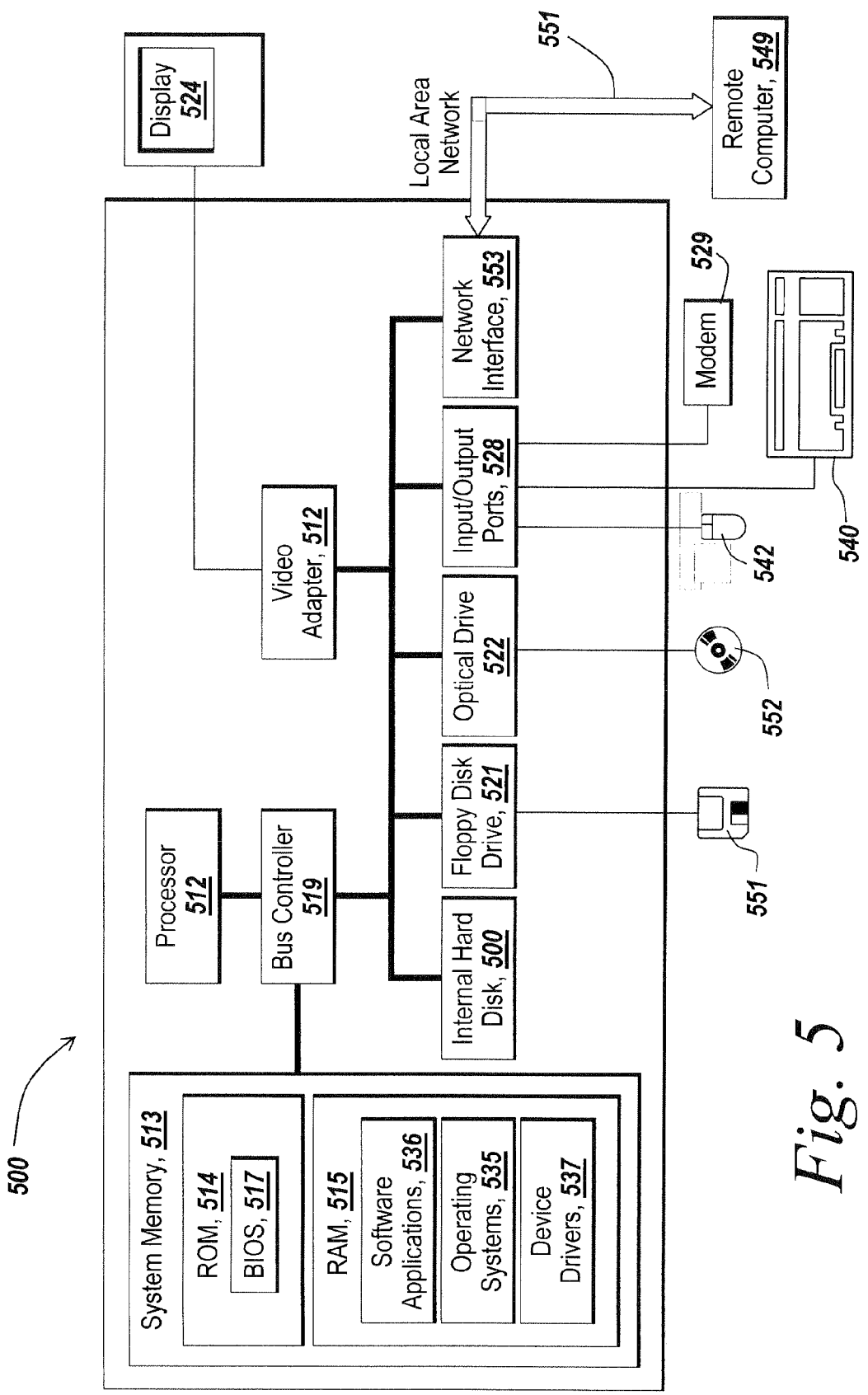
FIG. 5 is a block diagram illustrating a programmable processing system suitable for implementing and performing the apparatus and methods of the invention.

An example of one such type of computer is shown in FIG. 5, which shows a block diagram of a programmable processing system (system) 500 suitable for implementing or performing the apparatus or methods of the invention. As shown in FIG. 5, the system 500 includes a processor 512 that in one embodiment belongs to the PENTIUM® family of microprocessors manufactured by the Intel Corporation of Santa Clara, Calif. However, it should be understood that the invention can be implemented on computers based upon other microprocessors, such as the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. System 500 represents any server, personal computer, laptop or even a battery-powered, pocket-sized, mobile computer known as a hand-held PC or personal digital assistant (PDA).

System 500 includes system memory 513 (including read only memory (ROM) 514 and random access memory (RAM) 515, which is connected to the processor 512 by a system data/address bus 516. ROM 514 represents any device that is primarily read-only including electrically erasable programmable read-only memory (EEPROM), flash memory, etc. RAM 515 represents any random access memory such as Synchronous Dynamic Random Access Memory.

Within the system 500, input/output bus 518 is connected to the data/address bus 516 via bus controller 519. In one embodiment, input/output bus 518 is implemented as a standard Peripheral Component Interconnect (PCI) bus. The bus controller 519 examines all signals from the processor 512 to route the signals to the appropriate bus. Signals between the processor 512 and the system memory 513 are merely passed through the bus controller 519. However, signals from the processor 512 intended for devices other than system memory 513 are routed onto the input/output bus 518.

Various devices are connected to the input/output bus 518 including hard disk drive 520, floppy drive 521 that is used to read floppy disk 551, and optical drive 522, such as a CD-ROM drive that is used to read an optical disk 552. The video display 524 or other kind of display device is connected to the input/output bus 518 via a video adapter 525. Users enter commands and information into the system 500 by using a keyboard 540 and/or pointing device, such as a mouse 542, which are connected to bus 518 via input/output ports 528. Other types of pointing devices (not shown in FIG. 5) include track pads, track balls, joysticks, data gloves, head trackers, and other devices suitable for positioning a cursor on the video display 524.

As shown in FIG. 5, the system 500 also includes a modem 529. Although illustrated in FIG. 5 as external to the system 500, those of ordinary skill in the art will quickly recognize that the modem 529 may also be internal to the system 500. The modem 529 is typically used to communicate over wide area networks (not shown), such as the global Internet. Modem 529 may be connected to a network using either a wired or wireless connection. System 500 is coupled to remote computer 549 via local area network 550.

Software applications 536 and data are typically stored via one of the memory storage devices, which may include the hard disk 520, floppy disk 551, CD-ROM 552 and are copied to RAM 515 for execution. In one embodiment, however, software applications 536 are stored in ROM 514 and are copied to RAM 515 for execution or are executed directly from ROM 514.

In general, the operating system 535 executes software applications 536 and carries out instructions issued by the user. For example, when the user wants to load a software application 536, the operating system 535 interprets the instruction and causes the processor 512 to load software application 536 into RAM 515 from either the hard disk 520 or the optical disk 552. Once one of the software applications 536 is loaded into the RAM 515, it can be used by the processor 512. In case of large software applications 536, processor 512 loads various portions of program modules into RAM 515 as needed.

The Basic Input/Output System (BIOS) 517 for the system 500 is stored in ROM 514 and is loaded into RAM 515 upon booting. Those skilled in the art will recognize that the BIOS 517 is a set of basic executable routines that have conventionally helped to transfer information between the computing resources within the system 500. Operating system 535 or other software applications 536 use these low-level service routines. In one embodiment system 500 includes a registry (not shown) that is a system database that holds configuration information for system 500. For example, the Windows operating system by Microsoft Corporation of Redmond, Wash., maintains the registry in two hidden files, called USER.DAT and SYSTEM.DAT, located on a permanent storage device such as an internal disk.

The invention has been described in terms of particular embodiments. Other embodiments are within the scope of the following claims. For example, the steps of the invention can be performed in a different order and still achieve desirable results. This application is intended to cover any adaptation or variation of the present invention. It is intended that this invention be limited only by the claims and equivalents thereof.

The invention claimed is:

1. A method comprising:
    identifying, using a processor, a signature associated with a first method from a plurality of signatures associated with the first method, the first method being provided in a first computing environment, the first computing environment being an object-oriented environment, the identifying including:
    generating a fitness ranking for the identified signature, the fitness ranking for the identified signature indicating a fit of one or more data types of one or more parameters represented in the identified signature to one or more data types of one or more parameters associated with an invocation of a second method, the second method being provided in a second computing environment, the second computing environment being an array-based environment, generating a fitness ranking for a second signature in the plurality of signatures, the fitness ranking for the second signature indicating a fit of one or more data types of one or more parameters represented in the second signature to one or more data types of one or more parameters associated with the invocation of the second method, ranking the identified signature and the second signature based on the fitness ranking generated for the identified signature and the fitness ranking generated for the second signature, and identifying the identified signature based on the ranking of the identified signature and the second signature; and invoking the first method based on the identified signature.

2. The method of claim 1, wherein the fitness ranking for the identified signature is higher than the fitness ranking for the second signature.

3. The method of claim 1, wherein generating a fitness ranking for the identified signature further comprises:

generating a first preference value for a data type of a first parameter represented in the identified signature, the first preference value indicating a fit between the data type of the first parameter represented in the identified signature and a data type of a first parameter associated with the invocation of the second method;

generating a second preference value for a data type of a second parameter represented in the identified signature, the second preference value indicating a fit between of the data type of the second parameter represented in the identified signature and a data type of a second parameter associated with the invocation of the second method; and generating the fitness ranking for the identified signature based on the first preference value and the second preference value.

4. The method of claim 1, wherein invoking the first method further comprises:

converting an input parameter associated with the invocation of the second method to a data type of an input parameter represented in the identified signature.

5. The method of claim 1, wherein the first method returns an output parameter and wherein invoking the first method further comprises:

converting the output parameter to a data type defined within the second computing environment.

6. The method of claim 1, further comprising:

receiving the invocation of the second method via a command line interface.

7. A computer-readable memory storing one or more instructions for:

identifying a signature associated with a first method from a first signature associated with the first method and a second signature associated with the first method, the first method being provided in a first computing environment, the first computing environment being an object oriented environment, the identifying including:

generating a first fitness ranking, the first fitness ranking indicating a fit of a data type of a parameter represented in the first signature to a data type of a parameter associated with an invocation of a second method, the second method being provided in a second computing environment, the second computing environment being an array-based environment, generating a second fitness ranking, the second fitness ranking indicating a fit of a data type of a parameter represented in the second signature to the data type of the parameter associated with the invocation of the second method, ranking the first signature and the second signature based on the first fitness ranking and the second fitness ranking, and identifying the signature associated with the first method from the first signature and the second signature based on the ranking of the first signature and the second signature; and invoking the first method based on the identified signature.

8. The medium of claim 7, wherein the first fitness ranking is higher than the second fitness ranking and wherein the first signature is deemed a better fit to the invocation of the second method than the second signature based on the first fitness ranking being higher than the second fitness ranking.

9. The medium of claim 7, wherein an input parameter is associated with the invocation of the second method and wherein the medium further comprises one or more instructions for:

converting the input parameter associated with the invocation of the second method to a data type of an input parameter represented in the identified signature.

10. The medium of claim 7, wherein the first method returns an output parameter and wherein the medium further comprises one or more instructions for:

converting the output parameter to a data type defined within the second computing environment.

11. The medium of claim 7, further comprising one or more instructions for:

receiving the invocation of the second method via a command line interface.

12. A system comprising:

a processor for:

identifying a signature associated with a first method from a first signature associated with the first method and a second signature associated with the first method, the first method being provided in a first computing environment, the first computing environment being an object-oriented environment, the identifying including:

generating a first fitness ranking, the first fitness ranking indicating a fit of a data type of a parameter represented in the first signature to a data type of a parameter associated with an invocation of a second method, the second method being provided in a second computing environment, the second computing environment being an array-based environment, generating a second fitness ranking, the second fitness ranking indicating a fit of a data type of a parameter represented in the second signature to the data type of the parameter associated with the invocation of the second method, ranking the first signature and the second signature based on the first fitness ranking and the second fitness ranking, and identifying the signature associated with the first method from the first signature and the second signature based on the ranking of the first signature and the second signature, and invoking the first method based on the identified signature.

13. The system of claim 12, wherein the processor further:

receives the invocation of the second method via a command line interface.

14. A method comprising:
comparing a data type of a parameter, represented in a first signature of a first method, with a data type of a parameter associated with an invocation of a second method, the first method being provided in a first computing environment, the first computing environment being an object-oriented environment, the second method being provided in a second computing environment, the second computing environment being an array-based environment;
generating a fitness ranking for the first signature based on a result of the comparison of the data type of the parameter represented in the first signature of the first method, the fitness ranking for the first signature indicating a fit between the data type of the parameter represented in the first signature and the data type of the parameter associated with the invocation of the second method;
comparing a data type of a parameter, represented in a second signature of the first method, with the data type of the parameter associated with the invocation of the second method;
generating a fitness ranking for the second signature based on a result of the comparison of the data type of the parameter represented in the second signature of the first method, the fitness ranking for the second signature indicating a fit between the data type of the parameter represented in the second signature and the data type of the parameter associated with the invocation of the second method;
ranking the first signature and the second signature based on the fitness ranking for the first signature and the fitness ranking for the second signature;
selecting the first signature based on a result of the ranking of the first signature and the second signature; and
invoking, using a processor, the first method based on the first signature, the invoking including converting the parameter associated with the invocation of the second method based on the data type of the parameter represented in the first signature.

15. The method of claim 14, further comprising:
converting an input parameter associated with the invocation of the second method to a data type of an input parameter represented in the first signature.

16. The method of claim 14, further comprising:
converting a parameter returned by the first method to a data type defined within the second computing environment.

17. The method of claim 14, further comprising:
receiving the invocation of the second method via a command line interface.

* * * * *

UNITED STATES PATENT AND TRADEMARK OFFICE
CERTIFICATE OF CORRECTION

PATENT NO. : 8,037,481 B2
APPLICATION NO. : 12/780084
DATED : October 11, 2011
INVENTOR(S) : David A. Foti et al.

It is certified that error appears in the above-identified patent and that said Letters Patent is hereby corrected as shown below:

On the title page, column 2, references cited, of the printed patent, please change "Travis et. al" to --Travis Jr. et al.--.

Signed and Sealed this
Third Day of January, 2012

David J. Kappos
*Director of the United States Patent and Trademark Office*